United States Patent
Levine et al.

(10) Patent No.: US 11,035,480 B2
(45) Date of Patent: Jun. 15, 2021

(54) MECHANICALLY DRIVEN SEQUENCING MANIFOLD

(71) Applicants: Leanna M. Levine, Rancho Dominguez, CA (US); ALine, Inc., Rancho Dominguez, CA (US)

(72) Inventors: Leanna M. Levine, Rancho Dominguez, CA (US); Stefano Begolo, Rancho Dominguez, CA (US); Justin Podczerviensky, Rancho Dominguez, CA (US)

(73) Assignee: Leanna Levine and Aline, Inc., Rancho Dominguez, CA (US)

( * ) Notice: Subject to any disclaimer, the term of this patent is extended or adjusted under 35 U.S.C. 154(b) by 0 days.

(21) Appl. No.: 16/079,061

(22) PCT Filed: Feb. 24, 2017

(86) PCT No.: PCT/US2017/019525
§ 371 (c)(1),
(2) Date: Aug. 22, 2018

(87) PCT Pub. No.: WO2017/147533
PCT Pub. Date: Aug. 31, 2017

(65) Prior Publication Data
US 2019/0338859 A1    Nov. 7, 2019

Related U.S. Application Data

(60) Provisional application No. 62/299,468, filed on Feb. 24, 2016.

(51) Int. Cl.
*B01F 11/00* (2006.01)
*F16K 11/065* (2006.01)
(Continued)

(52) U.S. Cl.
CPC ............ *F16K 11/0655* (2013.01); *F01L 5/00* (2013.01); *B01F 11/0042* (2013.01); *B01F 13/00* (2013.01);
(Continued)

(58) Field of Classification Search
CPC .... B01F 5/00; B01F 11/0042; B01F 11/0045; B01F 13/00; B01F 13/0059;
(Continued)

(56) References Cited

U.S. PATENT DOCUMENTS 2,980,137 A     4/1961 George
3,323,550 A *   6/1967 Lee, II .............. F15C 1/02
                                            138/39
(Continued)

FOREIGN PATENT DOCUMENTS

FR          2375524 B1    4/1983

OTHER PUBLICATIONS

International Search Report, Appl. No. PCT/US17/19525, dated Sep. 17, 2017.
(Continued)

*Primary Examiner* — Matthew W Jellett
*Assistant Examiner* — Christopher D Ballman
(74) *Attorney, Agent, or Firm* — Hiibner Law; Kristin Hiibner

(57) ABSTRACT

A sequencing manifold for the purpose of supplying control and supply services of pre-determined temporal sequences to fluid processing assemblies is provided. The functioning of this sequencing manifold requires that translation be applied to the sequencing ports. Actuator mechanisms may supply such translation as either continuous motion or as a series of stepwise motions. Actuator mechanism can be obtained that rely on only mechanical means without the need for a source of electricity. With such actuators, it
(Continued)

becomes feasible to conduct the operations of fluid processing assemblies in remote and primitive locations that lack a source of electricity. One skilled in the mechanical arts can provide various actuator mechanisms to meet these requirements.

22 Claims, 13 Drawing Sheets

(51) Int. Cl.
*F01L 5/00* (2006.01)
*F16K 99/00* (2006.01)
*B01F 13/00* (2006.01)

(52) U.S. Cl.
CPC ....... *B01F 13/0059* (2013.01); *F16K 99/0001* (2013.01); *F16K 99/0003* (2013.01); *F16K 99/0034* (2013.01); *F16K 99/0036* (2013.01); *F16K 99/0055* (2013.01); *Y10T 137/0318* (2015.04); *Y10T 137/8593* (2015.04); *Y10T 137/877* (2015.04); *Y10T 137/87153* (2015.04)

(58) Field of Classification Search
CPC ........... F16K 99/0003; F16K 99/00034; F16K 99/0055; F16K 99/0001; F16K 99/0015; F16K 99/0036; Y10T 137/00; Y10T 137/0318; Y10T 137/8593; Y10T 137/877; Y10T 137/87153
See application file for complete search history.

(56) References Cited

U.S. PATENT DOCUMENTS

| | | | | |
|---|---|---|---|---|
| 3,678,959 | A | 7/1972 | Liposky | |
| 3,856,270 | A * | 12/1974 | Hemker | B01F 5/0604 366/340 |
| 3,881,701 | A * | 5/1975 | Schoenman | B01F 5/0256 239/403 |
| 3,991,055 | A * | 11/1976 | Godin | G01N 35/1097 436/180 |
| 4,493,476 | A | 1/1985 | Strickland et al. | |
| 4,534,659 | A * | 8/1985 | Dourdeville | B01F 3/088 366/338 |
| 4,570,674 | A | 2/1986 | Kaye | |
| 4,702,889 | A * | 10/1987 | Cabrera | G01N 1/38 137/240 |
| 4,726,932 | A * | 2/1988 | Feier | G01F 11/14 422/501 |
| 4,948,565 | A * | 8/1990 | Bemis | G01N 35/1097 251/355 |
| 5,250,263 | A * | 10/1993 | Manz | B01J 19/0093 422/504 |
| 5,295,400 | A * | 3/1994 | Tatani | G01N 35/1097 73/863.73 |
| 5,637,469 | A * | 6/1997 | Wilding | B01F 15/0264 366/DIG. 3 |
| 5,690,763 | A * | 11/1997 | Ashmead | B01F 5/0604 156/60 |
| 6,444,173 | B1 * | 9/2002 | Sjursen | B01L 3/0268 204/600 |
| 6,632,404 | B1 | 10/2003 | Freitag et al. | |
| 6,662,826 | B1 * | 12/2003 | Kokawa | F16K 11/074 137/597 |
| 6,935,768 | B2 * | 8/2005 | Lowe | B01F 5/0256 366/167.1 |
| 7,013,726 | B1 * | 3/2006 | Drummond | A61M 16/20 417/413.2 |
| 7,073,531 | B2 * | 7/2006 | Burgisser | B01L 3/0265 137/597 |
| 7,143,786 | B2 * | 12/2006 | Romero | F16K 3/08 137/606 |
| 7,147,364 | B2 * | 12/2006 | Oohashi | B01F 5/0256 366/162.4 |
| RE40,407 | E * | 7/2008 | Natarius | E03F 3/04 210/170.01 |
| 7,819,948 | B2 * | 10/2010 | Wagner | C01B 13/0259 137/616.7 |
| 8,206,025 | B2 * | 6/2012 | Natarajan | B01F 11/0045 366/146 |
| 8,534,909 | B2 * | 9/2013 | Guidat | B01F 5/0603 366/336 |
| 8,920,020 | B2 * | 12/2014 | Noishiki | B01J 19/00 366/181.5 |
| 9,689,508 | B2 * | 6/2017 | Deng | F16K 99/0034 |
| 2004/0112441 | A1 | 6/2004 | Burgisser | |
| 2005/0232076 | A1 * | 10/2005 | Yang | B01F 5/061 366/336 |
| 2006/0171864 | A1 * | 8/2006 | Caze | B01F 5/0603 422/130 |
| 2008/0094725 | A1 * | 4/2008 | Weekamp | B01F 11/0045 359/666 |
| 2010/0078086 | A1 | 4/2010 | Guidat et al. | |
| 2010/0165784 | A1 | 7/2010 | Jovanovich et al. | |
| 2012/0180884 | A1 * | 7/2012 | Brunello | B01F 5/0646 137/561 R |
| 2013/0008538 | A1 | 1/2013 | Schütze | |
| 2013/0263649 | A1 | 10/2013 | Storch et al. | |
| 2014/0144532 | A1 | 5/2014 | Jensen et al. | |
| 2015/0027547 | A1 | 1/2015 | Arce-Gonzalez | |
| 2016/0047491 | A1 | 2/2016 | Fuller et al. | |
| 2017/0216796 | A1 * | 8/2017 | Sameshima | B01F 5/0603 |

OTHER PUBLICATIONS

International Preliminary Report on Patentability, Appl. No. PCT/US17/19525, dated Apr. 9, 2018.
European Examination Report.
Supplemental European Search Report.

* cited by examiner

Fluid Processing Assembly Controlled with the Mechanically Driven Sequencing Manifold

MECHANICALLY DRIVEN SEQUENCING MANIFOLD

CROSS REFERENCE TO RELATED APPLICATIONS

This Application is a Continuation of and claims the benefit of PCT Application Number PCT/US2017/019525, filed on Feb. 24, 2017, which claims the benefit of U.S. Provisional Patent Application No. 62/299,468, filed on Feb. 24, 2016, titled "Jacquard Style Pneumatic Control Plate", the entire content of the foregoing applications are incorporated by reference in their entirety.

BACKGROUND

The desire for simple handheld analytical systems which use a fluid processing assembly to manage the performance of one or more tests with results that provide near real-time information is a growing opportunity in a number of markets. The tests involve the use of reagents that are optimized for a specific sample to provide one or more results that allow the user to make an informed decision. Managing the performance of the tests in the fluid processing assembly is facilitated with the implementation of fluid processing steps that mimic what one would do in a laboratory setting. A mechanism for performing the fluid processing steps involves managing the pressure drops in the fluid processing assembly to cause fluid movement in a controlled manner. The pressure drops are managed through external actuation supply lines whose states are controlled with electromechanical components.

The limitation of current electromechanical components is their cost, power consumption, limiting the use of batter power, or the need for a source of electricity. With complex actuation routines or to perform many tests at once, the number of electromechanical controls can be many. Confounding their application, the miniature electromechanical components needed for field portability are more expensive. Hence, it is difficult to implement in resource limited settings, such as remote or field-portable operations where low power consumption, low cost, ruggedness, and battery operation are desirable. By eliminating the need for the electromechanical components and hence the use of electricity to control fluid processing in the fluid processing assembly, the power requirement, portability, cost effectiveness, and ruggedness are vastly improved.

SUMMARY

The sequencing manifolds described in this application provide a means of managing sequenced fluid movements in a fluid processing assembly without the use of electromechanical components. The moving parts in the sequencing manifold program the sequence of supply services to the fluid processing assembly in a pre-programmed and controlled manner. The requirements for operation is the application of a mechanical force to drive the moving parts along the sequence of orifices that provide intermittent connections to the supply ports connected to the fluid processing assembly. The mechanical force can be provided by any of a number of non-electrical mechanisms including as an example, springs or manual operation. By managing the direction of movement of the moving parts in the manifold, the overall size of the sequencing manifold can be minimized to meet the need for portability and application in a remote environment.

BRIEF DESCRIPTION OF THE DRAWINGS

The figures included below with the description of attributes are intended to convey an understanding of the mechanical principles underpinning the operation of the sequencing manifold. For reasons of clarity, the figures depict configurations involving apparently geometrically flat plates rather than more complex configurations involving cylinders or circular discs. The omission of configurations involving cylinder or discs from the figures included with this application is not meant to be limiting in any manner.

DETAILED DESCRIPTION OF PREFERRED EMBODIMENTS

Figure 1:
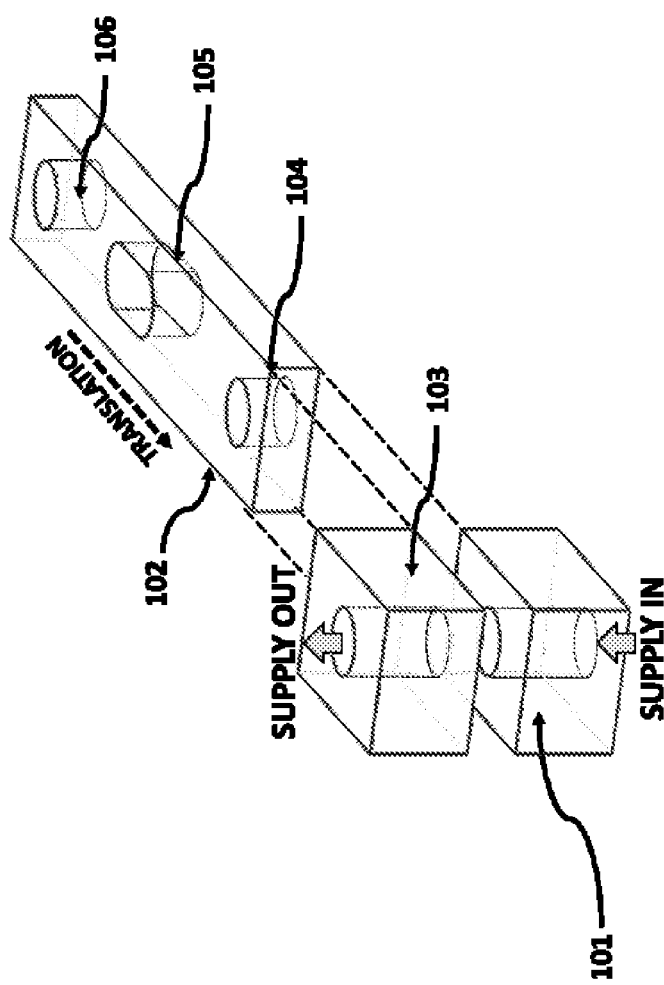
FIG. 1 illustrates one embodiment of the sequencing manifold having a three plate configuration according one embodiment of the present invention.

The physical embodiments of the sequencing manifolds of this invention have the following attributes:

1. Three Plate Configuration, Coaxial Inlet and Outlet Orifices.

A a mechanically driven sequencing manifold is comprised of three plates arranged face-to-face. The outer two plates are to be maintained in fixed positions relative to each other. The outer two plates are designated Plate 1 and Plate 3. The inner plate is arranged to be translatable relative to the fixed plates. The inner plate is designated Plate 2.

The purpose of the arrangement of plates described above is to provide a temporal sequence of supply services to the pilot actuators of multiple diaphragm valves located on some fluid processing assembly in order to execute the functions of the fluid processing assembly. The additional purpose of this arrangement may be to provide a temporal sequence of supply services to the fluid handling channels within the fluid processing assembly. Depending upon the requirements of the fluid processing assembly, supply services may comprise some or all of the following: gases at sub-ambient pressures, gases at ambient pressure, gases at supra-ambient pressures, a vent to ambient pressure, as well as liquids at supra-ambient pressures. Collectively, these purposes will be referred to in the following descriptions of attributes as "supplying services to the fluid processing assembly".

Plate 1, Plate 2, and Plate 3 contain ports that conduct the flow of supply services. A port is comprised of an inlet orifice and an outlet orifice. All of the ports referred to in this configuration have coaxial inlet and outlet orifices.

Plate 1 is penetrated by supply ports for one, or more, supply services. A single supply service may be connected to multiple supply ports via connections external to the sequencing manifold. An alternate configuration of these devices that achieves a similar result is presented in descriptions 2c, 4, 5, and 7c, below, wherein multiple connections of supply services are made using transfer channels internal to Plate 1.

Plate 3 is penetrated by control ports for directing sequentially timed supply services to the fluid processing assembly.

Plate 2 is penetrated by sequence ports that connect supply ports in Plate 1 to control ports in Plate 3 in a specific temporal sequence determined by the amount of translation of Plate 2 relative to Plate 1 (or equivalently, relative to Plate 3). The sequence ports in Plate 2 penetrate the complete thickness of Plate 2 such that the inlet orifice and outlet orifice of the sequence ports are coaxial. The sequence posts have various shapes, so as to provide the delivery of supply services to the fluid processing assembly in the required temporal sequences and for the required durations.

The combination of a supply port, a sequence port, and a control port that come into alignment on the sequencing manifold will be referred to as a sequencing gate. Multiple sequencing gates may be ganged together on the sequencing manifold.

The minimum cross sectional area of the ports that comprise a sequencing gate and associated transfer channels are determined by the mass flows demanded from the supply services by the fluid processing assembly. Larger dimensions may be included in the design to provide for reserve capacities or to facilitate fabrication.

The purpose of a sequencing gate is to provide control pulses of specific times of initiation and durations. The time of initiation of a control pulse will be determined by the location of the sequence port on Plate 2 relative to the associated control and supply ports and the translational velocity of Plate 2. The duration of a control pulse will be determined by the dimension of a sequence port in a direction "parallel" to the translation vector of Plate 2 divided by the translational velocity of Plate 2. Thus, many combinations of port locations, port dimensions, and translational velocities will provide control pulses of the same specific times of initiation and durations. Certain of these combinations may be more readily fabricated than others.

The surfaces of the plates in contact with each other are to be lubricated or have a lubricious coating. The lubricant or lubricious coating must be compatible with the materials of construction of Plate 1, Plate 2, and Plate 3. The three plates are held in close proximity using a mechanical clamping arrangement. The clamping force must be great enough to prevent leakage of supply service along unintended pathways from exceeding acceptable maximums. The clamping force must be modest enough to allow lineal translation of Plate 2 relative to Plate 1 and Plate 3. One skilled in the mechanical arts can provide many different clamping arrangements that achieve these goals.

The locations of the supply ports in Plate 1 are subject to few geometric limitations. One skilled in the art will be able to arrange supply ports in multiple configurations on Plate 1 that ultimately provide the same sequence of supply services to the fluid processing assembly.

The locations and shapes of the control ports in Plate 3 are subject to more rigorous geometric limitations. One skilled in the art will be able to arrange control ports in multiple configurations on Plate 3 that ultimately provide the same sequence of supply services to the pilot fluid processing assembly.

The geometric arrangements of the sequence ports in Plate 2 are highly constrained by the locations selected for the supply ports in Plate 1. The geometric arrangement and shape of the sequence ports in Plate 2 are further constrained by the locations selected for the control ports in Plate 3 and by the temporal sequence of supply services to be delivered to the fluid processing assembly required to execute the functions of the fluid processing assembly. In general, sequence ports will be arranged in lines or arcs "parallel" to the translation vector applied to the plate or cylinder containing the sequence ports.

There will be multiple configurations of supply ports, sequence ports, and control ports that ultimately provide the same sequence of supply services to the fluid processing assembly. One skilled in the art of microfabrication will be able to select configurations of all ports that can be fabricated within the constraints of existing fabrication techniques and that minimize the lineal translation required to achieve the desired temporal sequence of supply services to be delivered to the fluid processing assembly.

Figure 2:
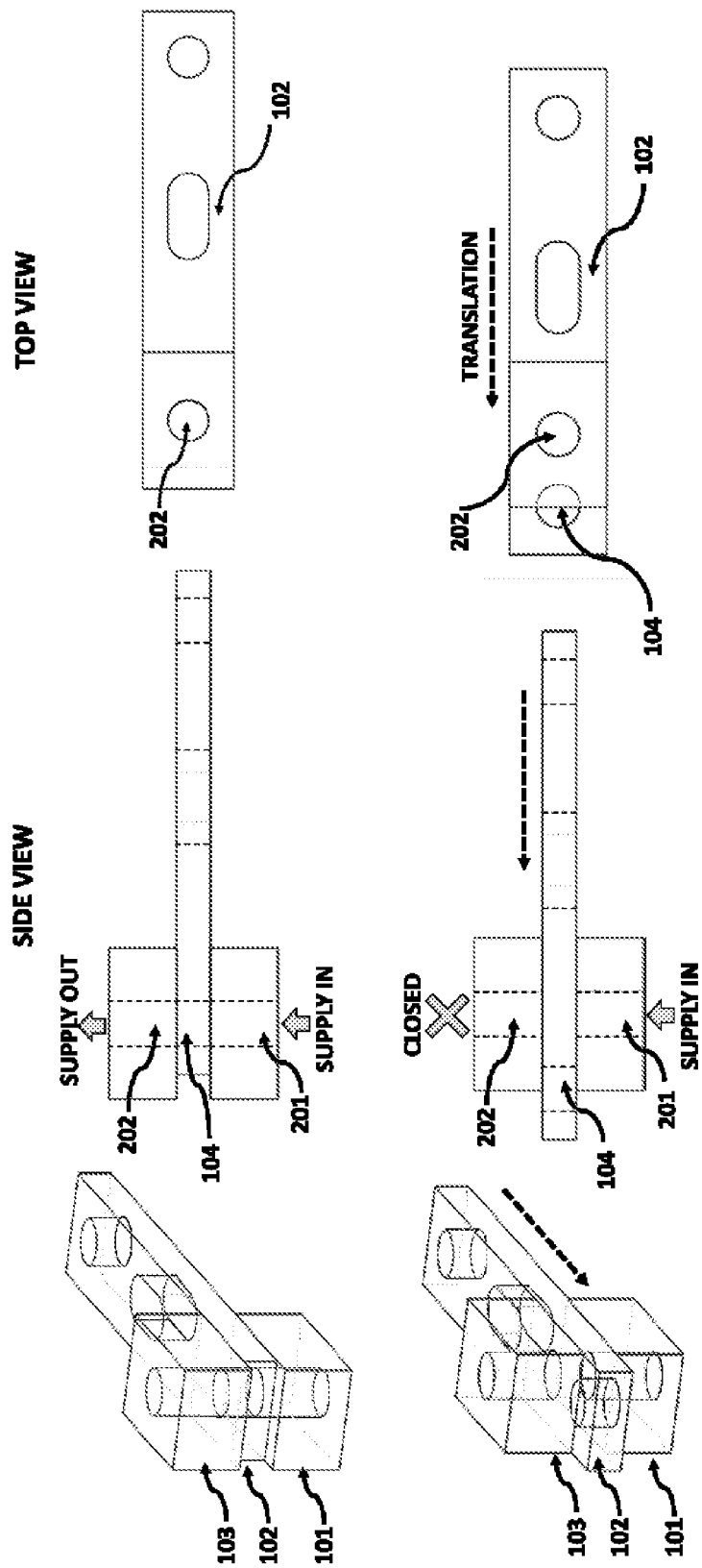
FIG. 2 is a cross sectional view of the alignments of Supply, Sequence and Control Ports of the sequencing manifold shown in FIG. 1.
Figure 3:
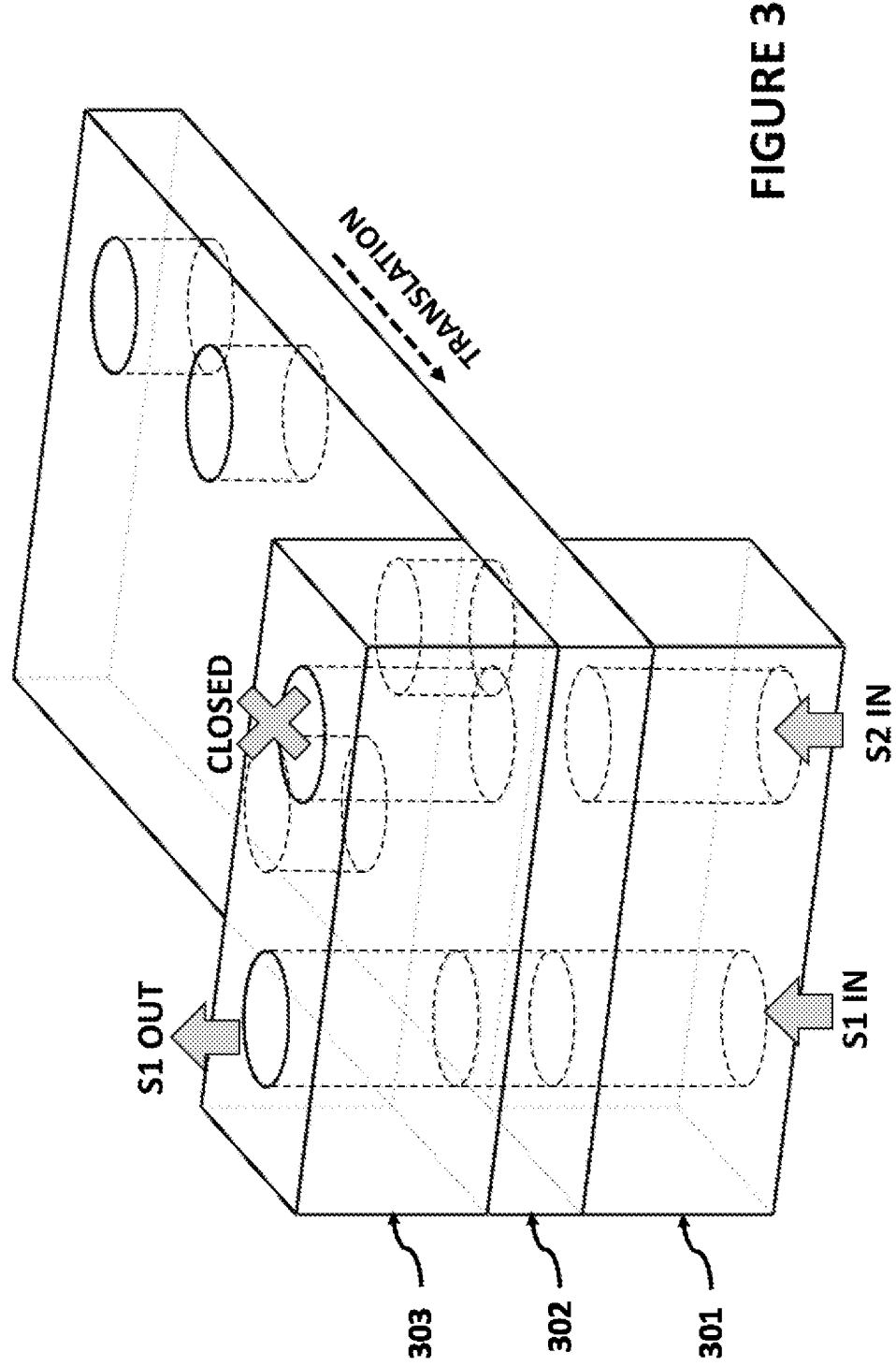
FIG. 3 illustrates two ganged sequencing gates on a single sequencing manifold.

In preparation for operation of the sequencing manifold, the movable Plate 2 is brought to a reproducible initial position. During operation of the sequencing manifold, Plate 2 is then lineally translated past the fixed plates at a known linear velocity. In this manner, the various supply ports become connected to the various control ports through the sequence ports at specific times after initiation of lineal translation and for specific durations depending on the locations and shapes of the ports and the lineal velocity of translation. One skilled in the mechanical arts will be able to select actuator mechanisms suitable to provide the lineal translation of the movable Plate 2. The arrangement of supply, sequence, and control ports in the three plates that comprise a sequencing gate is depicted in FIG. 1, FIG. 2 and FIG. 3.

2a. Three Plate Configuration, Non-Coaxial Sequence Orifices.

All of the attributes of the device of description 1 are retained, except the sequence ports in Plate 2 are comprised of an inlet orifice and an outlet orifice that are not coaxial, but rather, these orifices are laterally offset with respect to each other. The inlet orifice is on the side of the Plate 2 that is in opposition to the supply ports. The outlet orifice is on the side of the Plate 2 is in opposition to the control ports. The inlet and outlet orifices that comprise the sequence port are connected via a transfer channel contained within the Plate 2. One skilled in the art of micro fabrication can take multiple approaches to fabricating Plate 2 with this arrangement of inlet orifices, outlet orifices, and transfer channels 2b. Three Plate Configuration, Non-Coaxial Supply Orifices.

Figure 4:
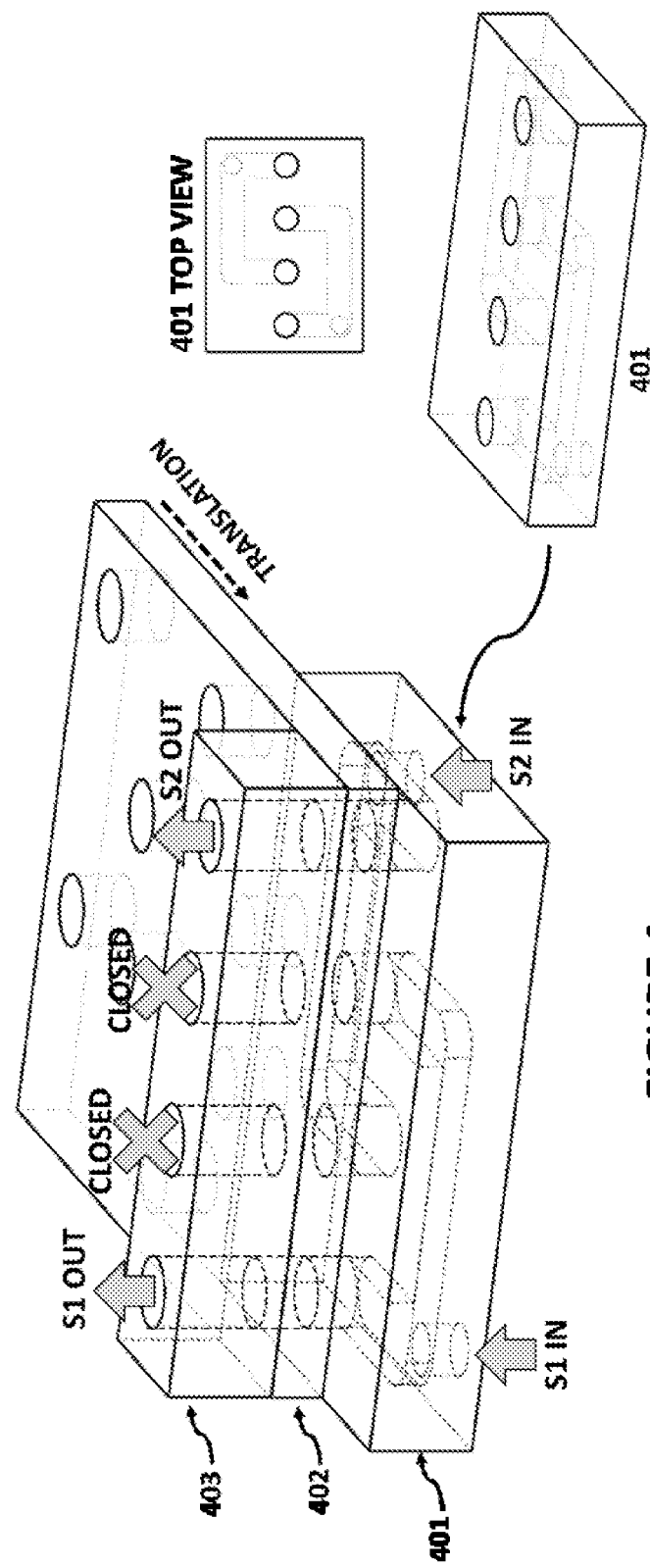
FIG. 4 illustrates a sequencing manifold having Supply Ports with Non-Coaxial Orifices and Internal Transfer Channels, according to another embodiment of the invention.

All of the attributes of the device of description 1 are retained, except the supply ports in Plate 1 are comprised of an inlet orifice and an outlet orifice that are not coaxial, but rather, these orifices are laterally offset with respect to each other. The outlet orifice is on the side of Plate 1 that is in apposition to the sequence ports in Plate 2. The inlet and outlet orifices that comprise the supply port are connected via a transfer channel contained within the Plate 1. Multiple outlet orifices may be connected via transfer channels to a single inlet orifice. One skilled in the art of micro fabrication can take multiple approaches to fabricating a plate with suitable arrangements of inlet orifices, outlet orifices, and transfer channels. FIG. 4, provides a diagram of non-coaxial supply orifices with multiple outlet orifices connected via transfer channels to a single inlet orifice.

2c. Three Plate Configuration, Non-Coaxial Control Orifices.

Figure 5:
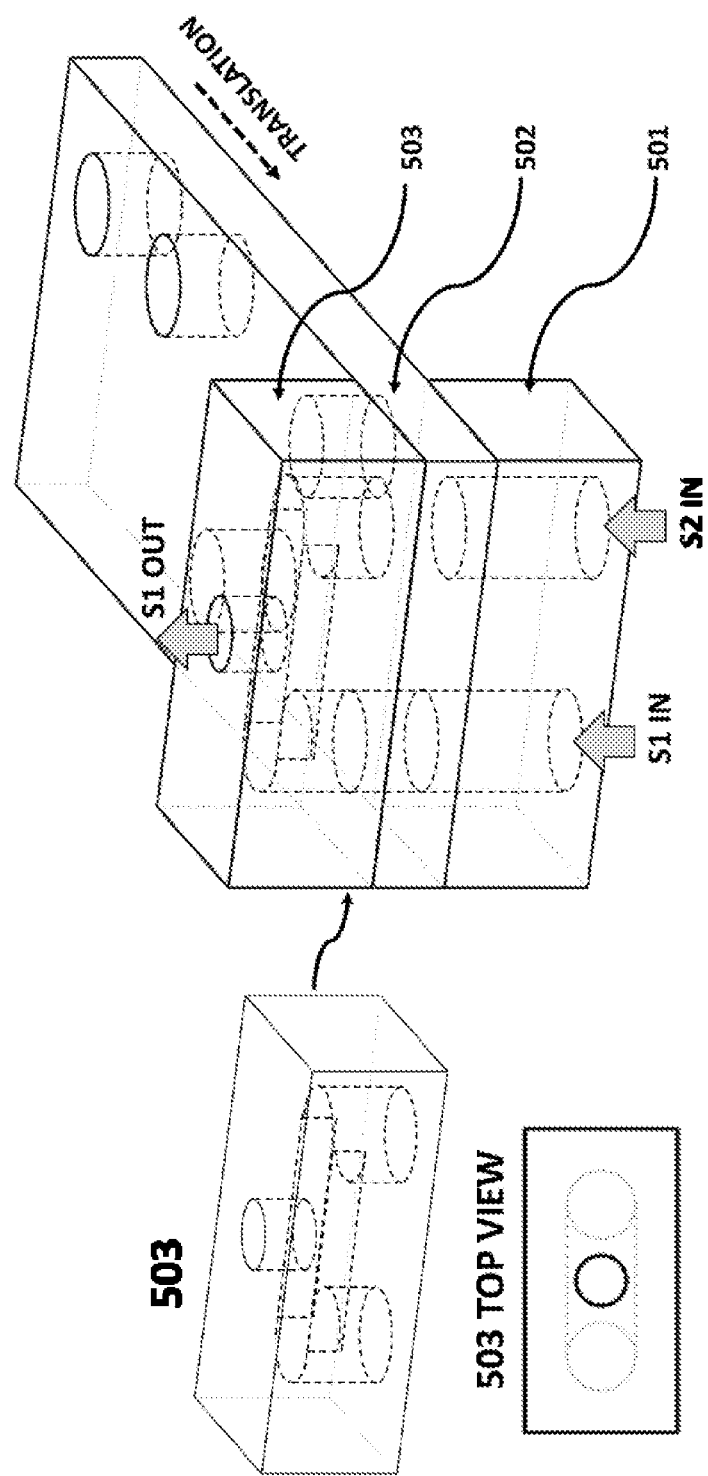
FIG. 5 illustrates a sequencing manifold having Control Ports with Non-Coaxial Orifices, according to another embodiment of the invention.
Figure 6:
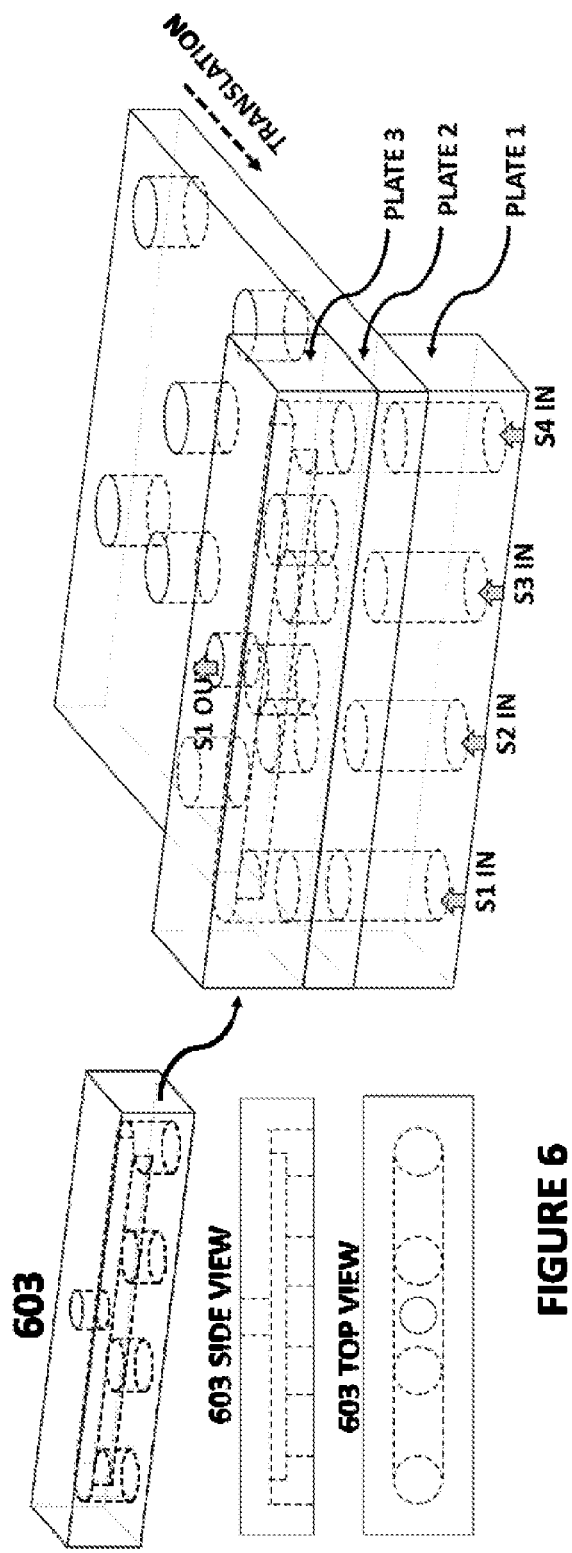
FIG. 6 illustrates a sequencing manifold having Four Supply Inputs Configured to Provide a 4-State Sequencing Gate, according to another embodiment of the invention.

All of the attributes of the device of description 1 are retained, except the control ports in Plate 3 are comprised of an inlet orifice and an outlet orifice that are not coaxial, but rather, these orifices are laterally offset with respect to each other. The inlet orifice is on the side of Plate 3 that is in to the sequence ports in Plate 2. The inlet and outlet orifices that comprise the control port are connected via a transfer channel contained within Plate 3. Multiple inlet orifices may be connected via transfer channels to a single outlet orifice of a control port. One skilled in the art of micro fabrication can take multiple approaches to fabricating a Plate 3 with this arrangement of inlet orifices, outlet orifices, and transfer channels. FIG. 5 illustrates one arrangement of non-coaxial control orifices in Plate 3. FIG. 6 depicts how the control ports of FIG. 5 may be extended to accept additional supply services.

2d. Three Plate Configuration, Coaxial and Non-Coaxial Orifices.

All of the attributes of the devices of descriptions 1, 2a, 2b, and 2c are retained, except that coaxial and non-coaxial orifices may be combined in a single device in all desired combinations.

Figure 7:
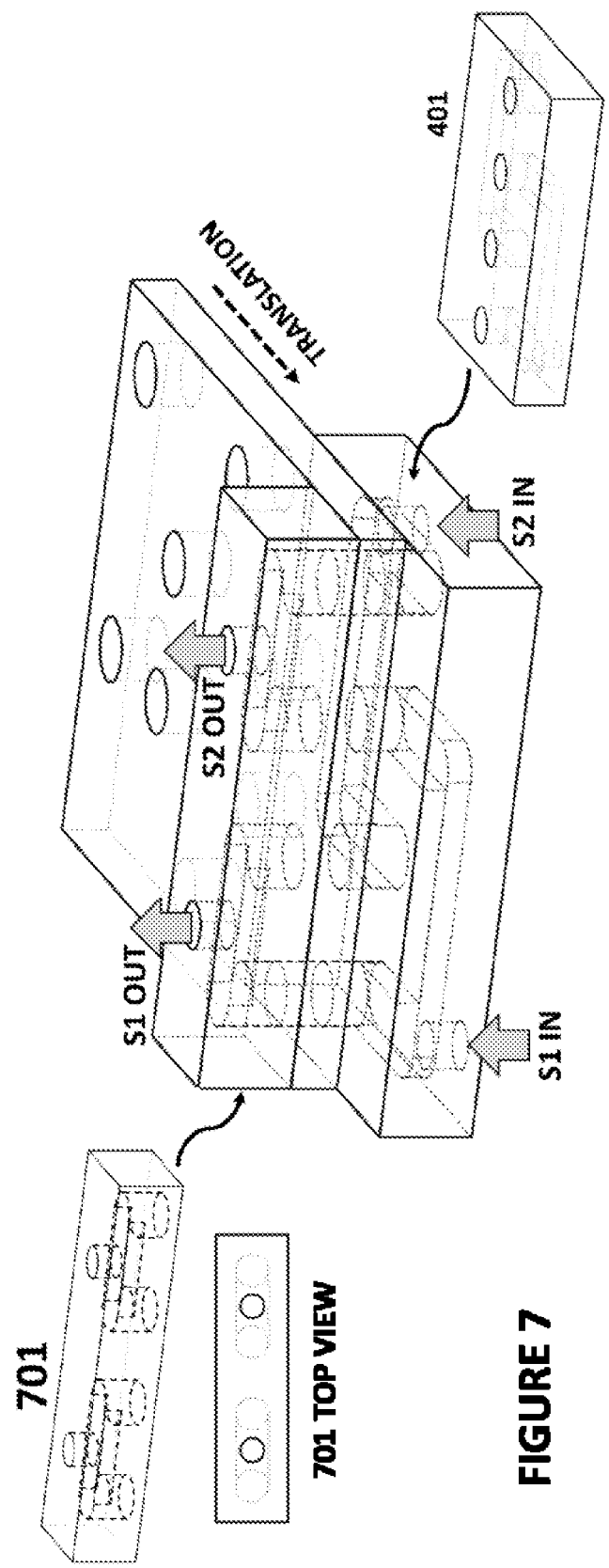
FIG. 7 illustrates a sequencing manifold having a Three Plate Configuration with Non-Axial Orifices in the Supply and Control Ports, according to another embodiment of the invention.

FIG. 7 shows a combination of coaxial sequence orifices and non-coaxial supply and control orifices.

There will be multiple configurations of supply ports, sequence ports, and control ports that ultimately provide the same sequence of supply services to the fluid processing assembly. One skilled in the art of micro fabrication will be able to select configurations of all ports that can be fabricated within the constraints of existing fabrication techniques and that minimize the translation required to achieve the desired temporal sequence of supply services to be delivered to the fluid processing assembly.

3. Two Plate Configuration.

Figure 8:
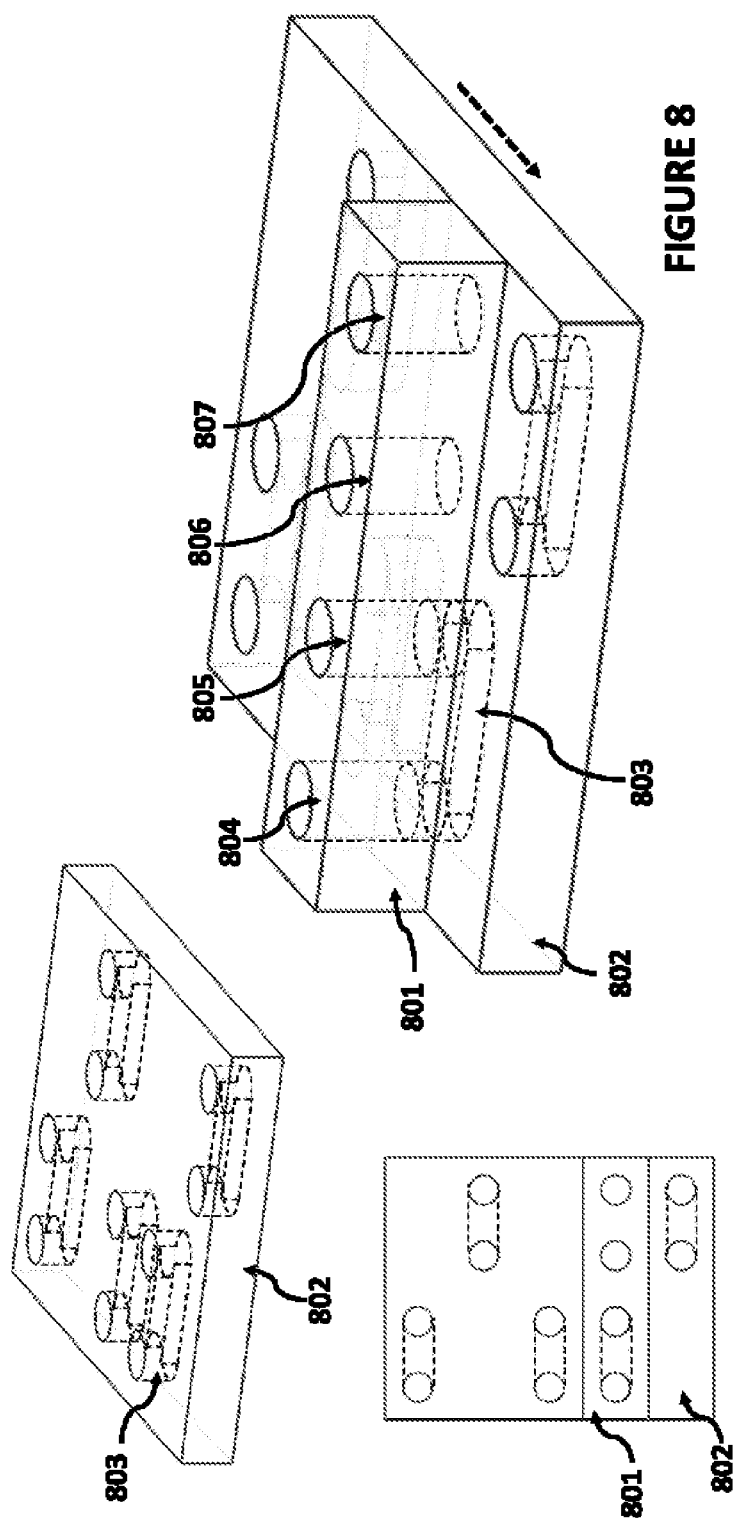
FIG. 8. illustrates a sequencing manifold having a Two Plate Configuration, according to another embodiment of the invention.

All of the attributes of the devices of description 2d are retained, except Plate 3 has been eliminated and both the supply ports and control ports are incorporated into Plate 1. The sequence ports in Plate 2 have an inlet orifice and an outlet orifice that are both on the face of Plate 2 that is in apposition to Plate 1. In this configuration, the inlet orifice and the outlet orifices that comprise a sequence port in Plate 2 are obligatorily non-coaxial and must be connected by a transfer channel contained within Plate 2. FIG. 8 shows an example of the two plate configuration.

4. Three Plates Configuration, Coaxial and Non-Coaxial Orifices, Rotational Translation.

Figure 9:
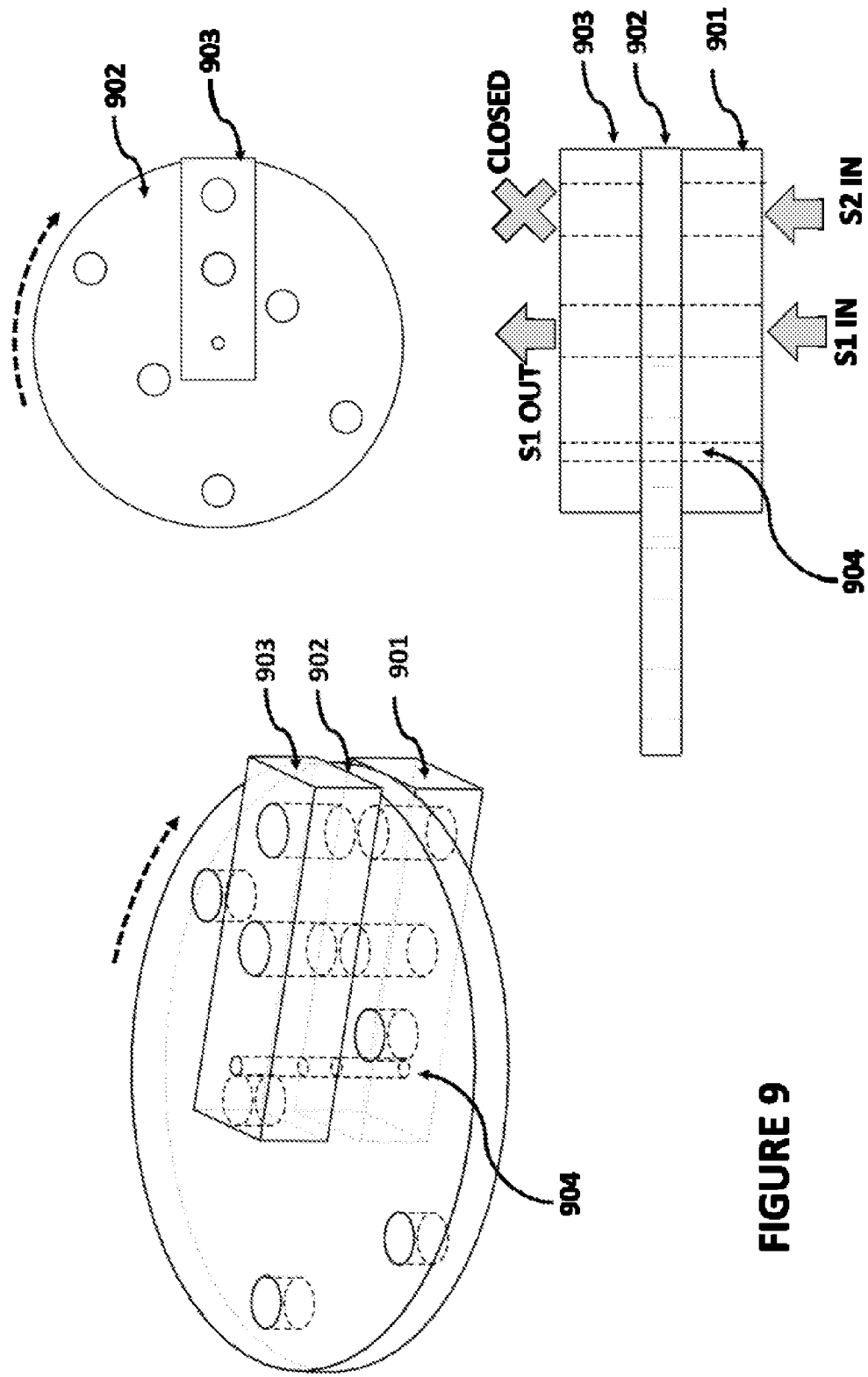
FIG. 9. illustrates a sequencing manifold having a Three Plate Configuration, rotational actuation, according to another embodiment of the invention.

All of the attributes of the devices of description 2d are retained, except rotational translation of Plate 2 is implemented instead of lineal translation of Plate 2. In general, sequence ports will be arranged along circular arcs as mandated by the rotational translation of Plate 2. FIG. 9 illustrates implementation of the three plate configuration using rotational translation.

5. Two Plates Configuration, Rotational Translation.

All of the attributes of the devices of description 3 are retained, except rotational translation of Plate 2 is implemented instead of lineal translation of Plate 2. In general, sequence ports will be arranged along circular arcs as mandated by the rotational translation of Plate 2.

6. Three and Two Plates Configuration, Combined Linear and Rotational Actuation.

All of the attributes of the devices of description 1, 2, 3, 4 and 5 are retained, except the actuation is a combination of lineal translation and rotational translation.

7. Three Plates Configuration, Non-Planar.

Figure 10:
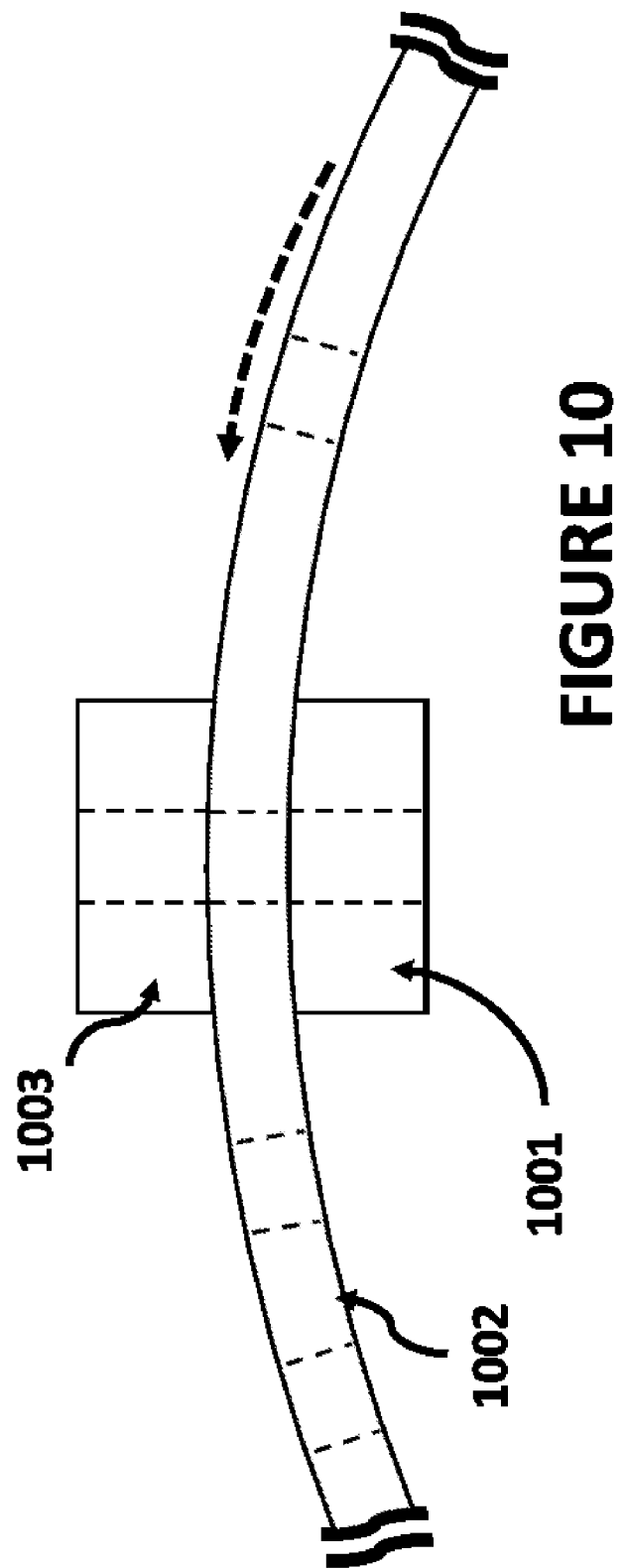
FIG. 10 illustrates a illustrates a sequencing manifold having a Three Plate configuration, non-planar actuation, according to another embodiment of the invention.

All of the attributes of the devices of description 1, 2, 4, and 6 are retained, except at least one of the plates is non-planar, such as a cylinder, portion of a cylinder, flexible layer or any combination. The three plates may be fabricated to sufficiently close tolerances as to prevent leakage of supply service along unintended pathways. FIG. 10 illustrates implementation of the three plates configuration where the sequence plate is non-planar.

8. Two Plate Configuration, Non-Planar.

All of the attributes of the devices of description 3 and 5 are retained, except at least one of the plates is non-planar, such as a cylinder, portion of a cylinder, flexible layer or any combination. The two plates may be fabricated to sufficiently close tolerances as to prevent leakage of supply service along unintended pathways.

EXAMPLES

Example 1: Use of Sliding Manifold to Control Diaphragm Valve

Figure 11:
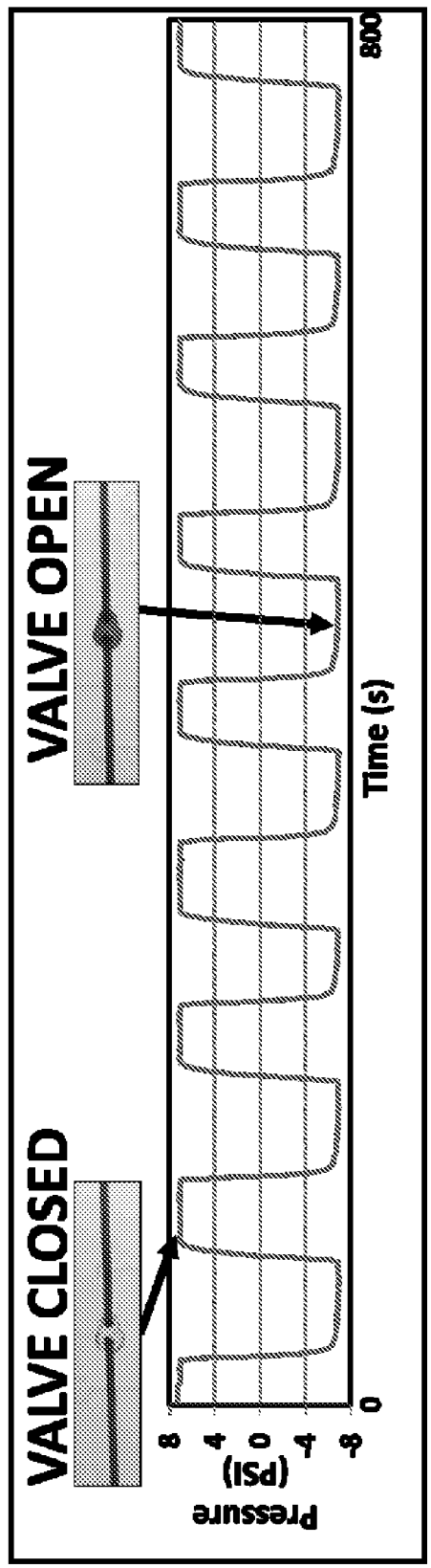
FIG. 11 illustrates the use of sliding manifold to control a diaphragm valve; according to another embodiment of the invention.

A sliding manifold with the geometry depicted in FIG. 5 was used to control a diaphragm valve. In this example the supplies used were positive pressure (S1=+7 psi,) and vacuum (S2=−7 psi). The program plate was designed in order to supply alternatively S1 to close the diaphragm valve or S2 to open the diaphragm valve. FIG. 11 shows the temporal pressure profile and images of the open and closed diaphragm valve actuated by the manifold.

Figure 12:
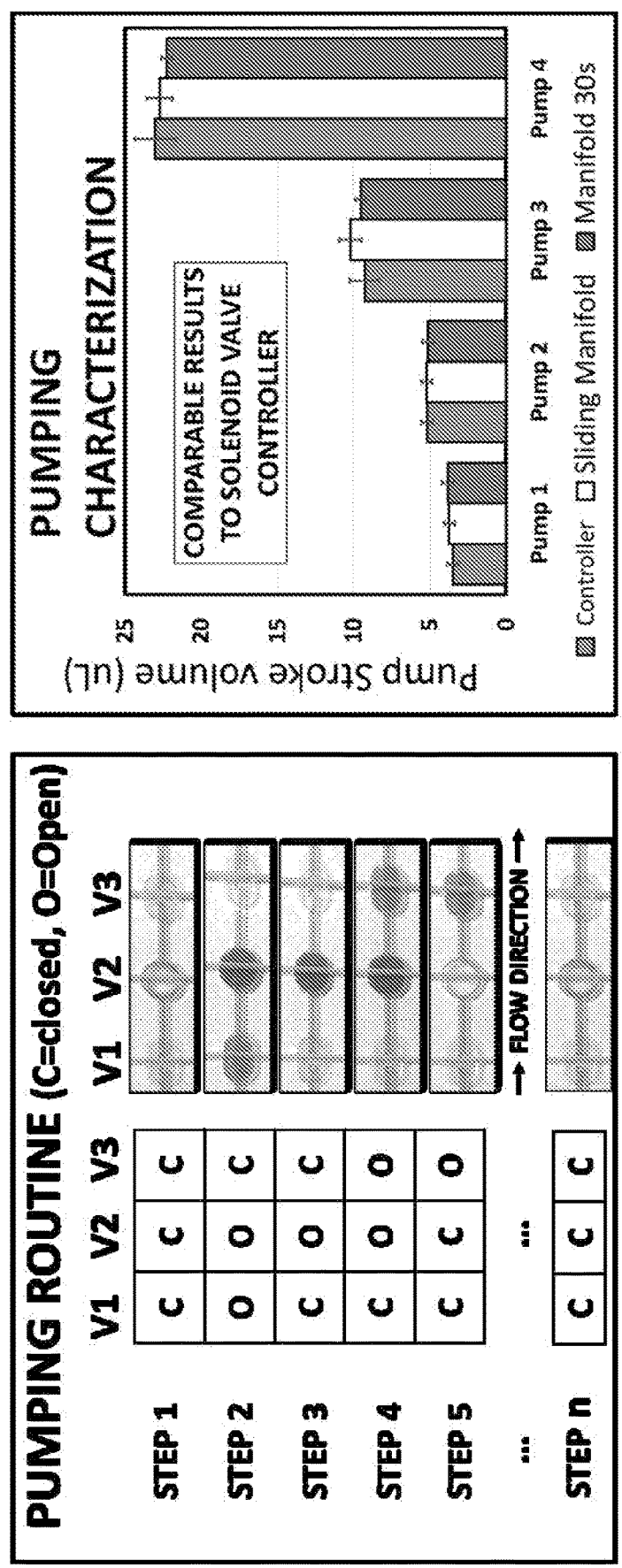
FIG. 12 illustrates the use of sliding manifold to control three diaphragm valves in parallel and achieve peristaltic pumping, according to another embodiment of the invention.

Example 2: Use of Sliding Manifold to Control Three Diaphragm Valves in Parallel and Achieve Peristaltic Pumping A sliding manifold with a geometry comprising three repetitions of the device depicted in FIG. 5 was used to control three diaphragm valves in parallel. In this example the supplies used were positive pressure (S1=+7 psi) and vacuum (S2=−7 psi). The program plate was designed in order to supply alternatively S1 or S2 to each of the diaphragm valve. The sequence of operations in the program plate allow for actuation of the pumping routine described in FIG. 12. FIG. 12 also shows the valves actuated by the pumping sequence with the direction of flow. Performances of peristaltic pumping did not change when comparing actuation by a standard pneumatic controller, sliding manifold and sliding manifold with 30 s pauses between each step (FIG. 12).

Example 3: Use of Sliding Manifold to Implement Multistep Protocol in Fluid Processing Assembly A sliding manifold comprising sixteen repetitions of the geometry depicted in FIGS. 1 and 2 was used to control 8 independent control ports (non-coaxial) and 5 independent supply ports (non-coaxial). This sliding manifold was used to implement a 12 steps protocol for controlling a fluid processing assembly capable of metering two volumes of liquid, mixing, de-bubbling and dispensing. The sequence of operation is described in FIG. 13.

FIG. 1. Temporal Output of Control Pulses from a Sequencing Gate Determined by the Translation of Sequence Ports.

FIG. 1 depicts only restricted segments of Plate 1 (101), Plate 2 (102), or Plate 3 (103). The full lateral extent of each plate has been omitted for the sake of clarity. As Plate 2 (102) translates past the supply port (201) in Plate 1 (101) and the control port (203) in Plate 3 (103), a temporal sequence of supply service pulses is produced as indicated in the graph on the right. The physical locations of sequence ports (104, 105, 106) in Plate 2 and the translational velocity determines the temporal sequence of when each control pulse is initiated. The dimension of each sequence port parallel to the translation vector and the translational velocity determines how long each control pulse persists. The alignments of supply, sequence, and control ports that comprise a sequencing gate is shown in cross section in FIG. 2.

FIG. 2. Cross Sectional View of the Alignments of Supply, Sequence and Control Ports During Functioning of a Sequencing Gate.

FIG. 3. Two Ganged Sequencing Gates on a Single Sequencing Manifold.

FIG. 3 illustrates how multiple control outputs to different functions on the fluid processing assembly may be obtained by ganging sequencing gates side-by-side on Plate 1 (301), Plate 2 (302), and Plate 3 (303). In this figure, two sequencing gates are ganged, but this design strategy may be extended to larger numbers of sequencing gates on a single sequencing manifold.

FIG. 4. Supply Ports with Non-Coaxial Orifices and Internal Transfer Channels.

The sequencing gates in FIG. 4 are designated 1 through 4, from left to right. While supply service, S1, is applied to gates 1 and 3, only control port 1 is active because the sequence port for gate 3 has not yet come into alignment. Similarly, only control port 4 is active in FIG. 4.

FIG. 5. Control Ports with Non-Coaxial Orifices.

FIG. 6 depicts how the control ports of FIG. 5 may be extended to accept additional supply services. As depicted, the arrangement in FIG. 6 comprises a 4-state sequence gate wherein the initiation and duration of each supply state is determined by the physical locations of the sequence ports in Plate 2 (602). The design strategy of FIG. 6 can be extended to arbitrary combinations of supply inputs through sequence ports to multi-state control outputs.

FIG. 6. Four Supply Inputs Configured to Provide a 4-State Sequencing Gate.

FIG. 7. Three Plate Configuration with Non-Axial Orifices in the Supply and Control Ports.

FIG. 7 shows a combination of four sequencing gates with two supply inputs and four independent control outputs. The gates are activated by lineal translation of the sequence plate, Plate 2 (702).

FIG. 8. Two Plate Configuration.

FIG. 8 provides a diagram of the two plate configuration, where supply ports (804, 807) and control ports (805, 806) are incorporated into plate 1 (801). The sequence ports (803) in Plate 2 (802) are non-coaxial and connected by a transfer channel contained within Plate 2.

FIG. 9. Three Plate Configuration, Rotational Actuation.

FIG. 9 illustrates implementation of the three plate configuration using rotational translation. Rotational actuation of Plate 2 (902) relative to Plate 1 (901) and Plate 3 (903) is performed. A central pin (904) can be used to guide the rotational actuation.

FIG. 10: Three Plate Configuration, Non-Planar Actuation.

FIG. 10 illustrates implementation of the non-planar three Plates configuration. A side view shows planar Plate 1 (1001) and Plate 3 (1003), with a non-planar Plate 2 (1002). Actuation is implemented in a non-planar fashion along the translation arrow.

FIG. 11: Use of Sliding Manifold to Control a Diaphragm Valve.

FIG. 12: Use of sliding manifold to control three diaphragm valves in parallel and achieve peristaltic pumping.

Figure 13:
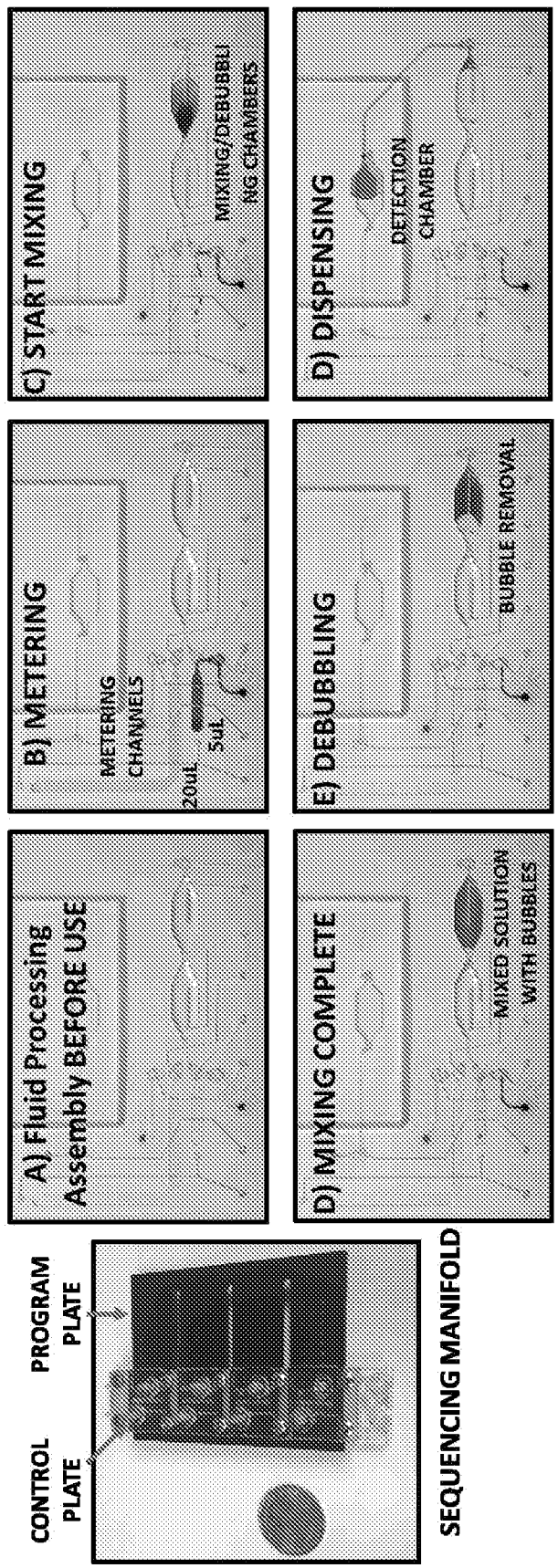
FIG. 13 illustrates the use of sliding manifold to implement multistep protocol in fluid processing assembly, according to another embodiment of the invention.

FIG. 13: Use of sliding manifold to implement multistep protocol in fluid processing assembly.

The invention claimed is:

1. A sequencing manifold for conducting a flow of supply services to a fluid processing assembly, the sequencing manifold comprising:
    a first plate having a top face, a bottom face, a thickness, a lateral extent, and one or more supply ports penetrating the thickness of the first plate;
    a second plate having a top face, a bottom face, a thickness, a lateral extent, and one or more control ports penetrating the thickness of the second plate, the second plate being in a fixed position relative to the first plate; and
    a third plate having a top face, a bottom face, a thickness, a lateral extent, and a plurality of sequence ports or a plurality of sets of sequence ports penetrating the thickness of the third plate, the plurality of sequence ports or sets of sequence ports being arranged in a sequence in the third plate and being positioned in fluid communication with both the top face of the first plate and the bottom face of the second plate, and translatable therebetween from a first position to a second position, and from a second position to a third and subsequent positions, relative to the first plate and the second plate,
    wherein, when the third plate translates to the first position, at least a first sequence port or set of sequence ports of the plurality of sequence ports on the third plate comes into fluid communication with one or more of the supply ports on the first plate and one or more of the control ports on the second plate to form a one or more sequencing gates to conduct a flow of supply services to a fluid processing assembly, and
    wherein, when the third plate translates to the second position, the first sequence port or set of sequence ports on the third plate is no longer in fluid communication with the one or more supply ports on the first plate or the one or more control ports on the second plate, such that the fluid communication between the one or more supply ports on the first plate and the one or more control ports on the second plate is engaged or interrupted based on the position of the first sequence port or set of sequence ports in the third plate relative to the first and second plates; and wherein, when the third plate further translates to the third and subsequent positions, the position of the third plate after translation becomes a new first position, and the sequence port or set of sequence ports on the third plate engages or interrupts fluid communication between the one or more supply ports on the first plate and the one or more control ports on the second plate, based on the position of the sequence ports, relative to the first and second plates, to conduct a flow of supply services to a fluid processing assembly through the sequentially arranged sequence ports or sets of sequence ports.

2. A sequencing manifold according to claim 1, wherein the first plate and the third plate are retained and the one or more control ports of the second plate are incorporated onto the first plate, such that the second plate is omitted, the sequencing manifold comprising:

a first plate having a top face, a bottom face, a thickness, a lateral extent, and one or more supply ports and one or more control ports penetrating the thickness of the first plate;

a third plate having a top face, a bottom face, a thickness, a lateral extent, and a plurality of sequence ports or plurality of sets of sequence ports, the plurality of sequence ports or sets of sequence ports being arranged in a sequence in the third plate and being positioned in fluid communication with the first plate, and translatable from a first position to a second position, relative to the first plate, wherein, the plurality of sequence ports or sets of sequence ports in the third plate each, individually, comprise an inlet orifice and an outlet orifice that do not penetrate the full thickness of the third plate, and where the inlet orifice and the outlet orifice are laterally displaced from each other, both the inlet orifice and the outlet orifice being located on the surface of the third plate that is proximal to the first plate, and where the inlet orifice and the outlet orifice are connected via a transfer channel contained within the thickness of the third plate, and wherein, when the third plate translates to the first position, a first sequence port or set of sequence ports on the third plate comes into fluid communication with one or more of the supply ports and one or more of the control ports on the first plate to form a one or more sequencing gates, which conduct a flow of supply services to a fluid processing assembly, and wherein, when the third plate translates to the second position, the first sequence port or set of sequence ports on the third plate is not in fluid communication with the one or more supply ports on the first plate or the one or more control ports on the first plate, such that the fluid communication between the one or more supply ports and the one or more control ports on the first plate is engaged or interrupted based on the position of the first set of sequence ports in the third plate relative to the first plate, and wherein, when the third plate further translates to the third and subsequent positions, the position of the third plate after translation becomes a new first position, and the sequence port or set of sequence ports on the third plate engages or interrupts fluid communication between the one or more supply ports and one or more control ports on the first plate, based on the position of the sequence ports, relative to the first plate, to conduct a flow of supply services to a fluid processing assembly through the sequentially arranged sequence ports or sets of sequence ports.

3. A sequencing manifold according to claim 2, wherein translation of the third plate to the third or subsequent positions, to engage or interrupt fluid communication between the supply port and the control port provides a temporal sequence of supply services to a fluid processing assembly.

4. A sequencing manifold according to claim 2, wherein fluid communication through the sequencing gate or gates is engaged or interrupted at a time interval after initiation of translation that is determined by the locations of the one or more supply ports, one or more sequence ports, and one or more control ports on their respective plates, a velocity of translation, and the initial position of the third plate relative to the first plate upon initiation of translation.

5. A sequencing manifold according to claim 2, wherein the duration of fluid communication from the supply port to the control port through the sequence port is determined by the lengths of the ports along a vector of translation and a velocity of translation.

6. A sequencing manifold according to claim 2, wherein multiple individual sequencing gates are ganged together.

7. A sequencing manifold according to claim 2, wherein one or more of the supply ports in the first plate, each individually, comprise an outlet orifice on the top face of the first plate, and an inlet orifice on the bottom face of the first plate, wherein, the inlet orifice and the outlet orifice on the first plate are laterally displaced from each other, the inlet orifice and the outlet orifice being connected via a transfer channel contained within the thickness of the first plate, and wherein, a single inlet orifice to a supply port on the first plate is connected to one or more outlet orifices through multiple transfer channels.

8. A sequencing manifold according to claim 2, wherein one or more of the control ports, each individually comprises an inlet orifice on the top face of the first plate and an outlet orifice on the bottom face of the first plate, wherein, the inlet orifice and the outlet orifice on the first plate are laterally displaced from each other, the inlet orifice and the outlet orifice being connected via a transfer channel contained within the thickness of the first plate, and wherein, a single inlet orifice on the first plate is connected to one or more outlet orifices through multiple transfer channels.

9. A sequencing manifold according to claim 2, wherein the sequence ports in the third plate comprise one or a plurality of inlet orifices located on the bottom of the third plate, and comprise one or a plurality of outlet orifices located on the bottom of the third plate, the plurality of sequence orifices being the same size or different sizes.

10. A sequencing manifold according to claim 2, wherein the third plate is translatable relative to the first plate along a vector of lineal translation or rotational translation.

11. A sequencing manifold according to claim 2, wherein the face of the first plate and third plate that are in fluid communication and in contact with each other have a lubricant or lubricious coating to provide a seal to prevent the flow of supply services along unintended pathways.

12. A sequencing manifold according to claim 2, wherein the face of the first plate and third plate that are in fluid communication and in contact with each other have a lubricant or lubricious coating to provide reduced friction between the moving parts.

13. A sequencing manifold according to claim 1, wherein translation of the third plate to the third or subsequent positions to engage or interrupt fluid communication between the one or more supply ports and the one or more control ports provides a temporal sequence of supply services to a fluid processing assembly.

14. A sequencing manifold according to claim 1, wherein, the fluid communication through the sequencing gate is engaged or interrupted at a time interval after initiation of translation that is determined by the locations of the one or more supply ports, one or more sequence ports, and one or more control ports in their respective plates, a velocity of translation, and the initial position of the third plate relative to the first and second plates.

15. A sequencing manifold according to claim 1, wherein the duration of fluid communication from the supply port to the control port through the sequence ports sequencing port, is determined by the lengths of the ports along the vector of translation and a velocity of translation.

16. A sequencing manifold according to claim 1, wherein multiple individual sequencing gates are ganged together.

17. A sequencing manifold according to claim 1, wherein one or more of the supply ports in the first plate, each individually, comprise an inlet orifice arranged on the bottom face of the first plate and an outlet orifice arranged on the top face of the first plate, the outlet orifice on the first plate being proximate to an inlet orifice on the third plate,
wherein, the inlet orifice on the first plate and the outlet orifice on the first plate are laterally displaced from each other, the inlet orifice and the outlet orifice being connected via a transfer channel contained within the thickness of the first plate, and
wherein, a single inlet orifice on the first plate is connected to one or more outlet orifices through multiple transfer channels.

18. A sequencing manifold according to claim 1, wherein one or more of the control ports in the second plate, each individually, comprise an inlet orifice arranged on the bottom surface of the second plate and an outlet orifice arranged on the top surface of the second plate, the inlet orifice on the second plate being proximate to an outlet orifice on the third plate,
wherein, the inlet orifice on the second plate and the outlet orifice on the second plate are laterally displaced from each other, the inlet orifice and the outlet orifice being connected via a transfer channel contained within the thickness of the second plate, and
wherein, a single inlet orifice on the second plate is connected to one or more outlet orifices through multiple transfer channels.

19. A sequencing manifold according to claim 1, wherein the sequence ports in the third plate comprise one or a plurality of inlet orifices located on the bottom of the third plate, and comprise one or a plurality of outlet orifices located on the top of the third plate, the plurality of sequence orifices being the same size or different sizes.

20. A sequencing manifold according to claim 1, wherein the third plate is translatable relative to the first plate along a vector of lineal translation or rotational translation.

21. A sequencing manifold according to claim 1, wherein the face of the first plate, second plate, and third plate that are in fluid communication and in contact with each other have a lubricant or lubricious coating to provide a seal to prevent the flow of fluid along unintended pathways.

22. A sequencing manifold according to claim 1, wherein the face of the first plate, second plate, and third plate that are in fluid communication and in contact with each other have a lubricant or lubricious coating to provide reduced friction between the moving parts.

* * * * *